(12) United States Patent
Kwag et al.

(10) Patent No.: US 10,565,368 B2
(45) Date of Patent: Feb. 18, 2020

(54) ELECTRONIC DEVICE AND METHOD OF CONTROLLING SAME

(71) Applicant: Samsung Electronics Co., Ltd., Suwon-si, Gyeonggi-do (KR)

(72) Inventors: Kyung-soo Kwag, Suwon-si (KR); Chang-sup Ahn, Seoul (KR); Joon-hyuk Ryu, Seoul (KR); Jung-kyuen Lee, Seongnam-si (KR); Ji-yeon Choi, Suwon-si (KR); Sung-hyun Hong, Incheon (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 19 days.

(21) Appl. No.: 15/742,694

(22) PCT Filed: Jul. 5, 2016

(86) PCT No.: PCT/KR2016/007212
§ 371 (c)(1),
(2) Date: Jan. 8, 2018

(87) PCT Pub. No.: WO2017/014447
PCT Pub. Date: Jan. 26, 2017

(65) Prior Publication Data
US 2018/0196937 A1 Jul. 12, 2018

(30) Foreign Application Priority Data
Jul. 21, 2015 (KR) .................. 10-2015-0102940

(51) Int. Cl.
*G06F 21/52* (2013.01)
*G06F 3/048* (2013.01)
(Continued)

(52) U.S. Cl.
CPC ............ *G06F 21/52* (2013.01); *G06F 3/048* (2013.01); *G06F 3/04817* (2013.01);
(Continued)

(58) Field of Classification Search
CPC ....... G06F 21/52; G06F 3/048; G06F 3/04817; G06F 21/00; G06F 21/552; G06F 21/74;
(Continued)

(56) References Cited

U.S. PATENT DOCUMENTS 7,849,310 B2   12/2010  Watt et al.
7,886,098 B2    2/2011  Kershaw et al.
(Continued)

FOREIGN PATENT DOCUMENTS

CN    104182687 A    12/2014
KR    10-1146180 B1   5/2012
(Continued)

OTHER PUBLICATIONS

Li et al., A Secure User Interface for Web Applications Running Under an Untrusted Operating System, Jul. 2010, 10th IEEE International Conference on Computer and Information Technology, pp. 865-870 (Year: 2010).*
(Continued)

*Primary Examiner* — Kenneth W Chang
(74) *Attorney, Agent, or Firm* — Jefferson IP Law, LLP

(57) ABSTRACT

Provided are an electronic device and a method of controlling same. The method of controlling the electronic device: displays a UI including a security index showing that the electronic device is in a state operating in a secure mode; compares the security index to a reference security index and determines whether the security index has been falsified; and when the security index is a falsified security index, shows that the security index is a security index that has been falsified.

16 Claims, 17 Drawing Sheets

(51) Int. Cl.
*G06F 21/00* (2013.01)
*G06F 21/55* (2013.01)
*G06F 21/74* (2013.01)
*G06F 21/84* (2013.01)
*G06F 3/0481* (2013.01)
*G06F 21/36* (2013.01)

(52) U.S. Cl.
CPC ............ *G06F 21/00* (2013.01); *G06F 21/552* (2013.01); *G06F 21/74* (2013.01); *G06F 21/84* (2013.01); *G06F 21/36* (2013.01); *G06F 2221/2105* (2013.01)

(58) Field of Classification Search
CPC ... G06F 21/84; G06F 21/36; G06F 2221/2105
See application file for complete search history.

(56) References Cited

U.S. PATENT DOCUMENTS

| | | | |
|---|---|---|---|
| 8,171,311 B2 | 5/2012 | Watt | |
| 8,418,175 B2 | 4/2013 | Mansell et al. | |
| 8,775,824 B2 | 7/2014 | Kershaw et al. | |
| 8,793,786 B2* | 7/2014 | Bhesania | G06F 21/83 713/100 |
| 9,158,942 B2* | 10/2015 | Sahita | G06T 1/60 |
| 2004/0123118 A1* | 6/2004 | Dahan | G06F 21/36 713/189 |
| 2005/0149486 A1* | 7/2005 | Nason | G06F 21/82 |
| 2005/0166064 A1* | 7/2005 | Dive-Reclus | G06F 21/6281 713/189 |
| 2005/0235351 A1* | 10/2005 | Seltzer | G06F 21/36 726/14 |
| 2006/0021031 A1* | 1/2006 | Leahy | C12N 5/0636 726/22 |
| 2008/0172382 A1 | 7/2008 | Prettejohn | |
| 2010/0031320 A1* | 2/2010 | Bhesania | G06F 21/83 726/4 |
| 2010/0115594 A1* | 5/2010 | Paya | H04L 9/3271 726/5 |
| 2010/0145854 A1 | 6/2010 | Messerges et al. | |
| 2013/0219508 A1 | 8/2013 | Lee et al. | |
| 2014/0041050 A1 | 2/2014 | Heider | |
| 2014/0298478 A1 | 10/2014 | Kim et al. | |
| 2014/0337801 A1 | 11/2014 | Wang et al. | |
| 2015/0007322 A1 | 1/2015 | Hay et al. | |

FOREIGN PATENT DOCUMENTS

| | | |
|---|---|---|
| KR | 10-2012-0096320 A | 8/2012 |
| KR | 10-1489152 B1 | 2/2015 |
| KR | 10-2015-0075349 A | 7/2015 |
| WO | 2008/114257 A2 | 9/2008 |
| WO | 2010/090357 A1 | 8/2010 |
| WO | 2016/015680 A1 | 2/2016 |

OTHER PUBLICATIONS

Zhou Yu et al., "Visual Similarity based Anti-Phishing with the Combination of Local and Global Features", 2014 IEEE 13th International Conference on Trust, Security and Privacy in Computing and Communications, IEEE, Sep. 24, 2014, pp. 189-196, XP032725011.
European Office Action dated Oct. 31, 2018, issued in European Patent Application No. 16827951.1.
Korean Office Action dated Nov. 7, 2019, issued in Korean Patent Application No. 10-2015-0102940.

* cited by examiner

ELECTRONIC DEVICE AND METHOD OF CONTROLLING SAME

TECHNICAL FIELD

The present invention relates to an electronic device and a control method thereof, and more particularly, to an electronic device capable of displaying a user interface (UI) including a secure indicator and a control method thereof.

BACKGROUND ART

In recent years, purchase of goods through the Internet is possible and bank transactions is possible without going to the bank. As the people, who purchase goods or do bank transactions using smart phones or personal computers (PCs), have been increasingly increased, there is a need for security for important information (for example, password and the like).

In response to operations requiring security being performed according to the needs, the operations may be performed in a secure mode. However, even in response to the operations requiring security being performed in the secure mode, the operations are performed in the insides of the devices and thus the user may not accurately know whether or not the devices operate in the secure mode while the user inputs the important information. To solve the problem, a secure indicator indicating that the electronic device operates in the secure mode is displayed. For example, in response to a bank application being executed through a smart phone, an icon indicating that the secure program is executing is simultaneously displayed in the upper left end of a display screen. In response to the secure indicator being displayed, the user knows that the electronic device operates in the secure mode and inputs the important information with an easy mind.

However, in response to a forged or leaked secure indicator being displayed, the user who cannot know that the indicated secure indicator is a forged or leaked secure indicator may think that the display device operates in the secure mode and input the important information and thus the secure problems may occurs.

Accordingly, there is a need for warning the user of a forged secure indicator in response to the forged secure indicator being displayed.

DETAILED DESCRIPTION OF THE INVENTION

Technical Problem

The present invention has been made in view of the above problems, and the object of the present invention is to provide an electronic device which warns that a secure indicator indicating that the electronic device operates in a secure mode is a forged secure indicator in response to the secure indicator being forged and a control method thereof.

Technical Solution

To obtain the above-described object, the present invention is to provide a control method of an electronic device including the steps of displaying a user interface (UI) including a secure indicator indicating that the electronic device operates in a secure mode, determining whether or not the secure indicator is forged by comparing the secure indicator and a reference secure indicator, and notifying that the secure indicator is a forged secure indicator in response to the secure indicator being the forged secure indicator.

The step of determining may include the step of detecting data of a frame buffer used for displaying the UI using UI-related information corresponding to the UI and the step of determining may include the step of determining whether or not the secure indicator is forged by comparing data stored in the frame buffer and data of the reference secure indicator.

The step of determining may include the step of detecting data of a frame buffer corresponding to an uppermost layer among a plurality of layers and data of a frame buffer corresponding to a layer used for displaying the secure indicator and the step of determining may include the step of determining whether or not the secure indicator is forged by comparing detected data and data of the reference secure indicator.

The step of determining may include the step of detecting, in response to a position in which the secure indicator is displayed in the UI being fixed, data of frame buffers corresponding to layer regions corresponding to a fixed position in which the secure indicator is displayed and the step of determining may include the step of determining whether or not the secure indicator is forged by comparing detected data and data of the reference secure indicator.

The secure indicator may include at least one of an image, text, and an icon.

The control method may further include the step of updating the UI-related information. The step of updating may include the step of updating the UI-related information in any one case of fixed period arrival, user command input for updating the UI-related information, UI generation including the secure indicator, and UI updating including the secure indicator.

The UI-related information may include at least one of information for a using application, layer information used in the using application, a memory address and a size of a using frame buffer, and an address and a size of a memory to be used as the frame buffer.

The present invention is to provide an electronic device including a storage unit configured to store data corresponding to a reference secure indicator, a display unit configured to display a user interface (UI) including a secure indicator indicating that the electronic device operates in a secure mode, and a control unit configured to determine whether or not the secure indicator is forged by comparing the secure indicator and the reference secure indicator in response to the UI being displayed in the display unit and generate a warning event for notifying that the secure indicator is a forged secure indicator in response to the secure indicator being the forged secure indicator.

The control unit may detect data of a frame buffer used for displaying the UI using UI-related information corresponding to the UI and determine whether or not the secure indicator is forged by comparing data stored in the frame buffer and data of the reference secure indicator.

The control unit may detect data of a frame buffer corresponding to an uppermost layer among a plurality of layers and data of a frame buffer corresponding to a layer used for displaying the secure indicator and determine whether or not the secure indicator is forged by comparing detected data stored in the frame buffers and data of the reference secure indicator.

The control unit may detect, in response to a position in which the secure indicator is displayed in the UI being fixed, data of frame buffers corresponding to layer regions corresponding to a fixed position in which the secure indicator is displayed and determine whether or not the secure indicator is forged by comparing detected data and data of the reference secure indicator.

The secure indicator may include at least one of an image, text, and an icon.

The control unit may update UI-related information. The control unit may update the UI-related information in any one case of fixed period arrival, user command input, UI generation including the secure indicator, and UI updating including the secure indicator.

The warning event may include at least one of warning phrase display, executing program termination, user command non-reception, and warning sound output.

The UI-related information may include at least one of information for a using application, layer information used in the using application, a memory address and a size of a using frame buffer, and an address and a size of a memory to be used as the frame buffer.

The present invention is to provide a non-transitory computer-readable recording medium including a program for executing a method for determining whether or not a secure indicator of an electronic device is forged including the steps of displaying a user interface (UI) including a secure indicator indicating that the electronic device operates in a secure mode, determining whether or not the secure indicator is forged by comparing the secure indicator and a reference secure indicator, and notifying that the secure indicator is a forged secure indicator in response to the secure indicator being the forged secure indicator.

Effect of the Invention

As described above, according to various embodiments of the present invention, the user may be provided with security-enhanced security applications through warning that an electronic device is using a forged secure indicator.

MODE FOR INVENTION

Figure 1:
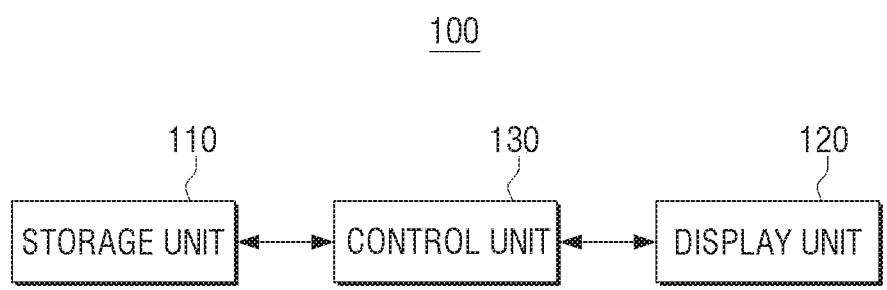
FIG. 1 is a schematic block diagram illustrating a configuration of an electronic device according to an embodiment of the present invention.

Terms used in an embodiment of the present invention will be briefly described before detailed description of the embodiment is made.

As the terminology used in an embodiment of the present invention, general terms which are widely used recently are selected in consideration of functions in the present invention, but the terms used herein may be changed depending on the intention of the technician in the art to which this inventive concept belongs, precedents, appearance of new technology, and the like. In certain cases, a portion of the terms used herein may be terms arbitrarily selected by the applicant and the meaning of the selected terms should be interpreted in detail in corresponding embodiments. Accordingly, the terms used in the embodiments should not be construed as merely descriptive terms, but rather should be defined on the basis of the meaning of the terms and content in the embodiments.

It will be understood that, although the terms first, second, etc. may be used herein in reference to elements of the invention, such elements should not be construed as limited by these terms. The terms are used only to distinguish one element from other elements. For example, without departing from the spirit of the inventive concept, a first element may refer to a second element, and similarly, the second element may refer to the first element. The term "and/or" includes a combination of a plurality of related stated items or any item of the plurality of related stated items.

As used herein, the singular forms "a," "an" and "the" are intended to include the plural forms as well, unless the context clearly indicates otherwise.

It will be further understood that the terms "comprise" and/or "have" in an embodiment, specify the presence of stated features, integers, steps, operations, elements, components, and/or groups thereof, but do not preclude the presence or addition of one or more other features, integers, steps, operations, elements, components, and/or groups thereof.

In an embodiment, the term "module" or "unit" may refer to an element which performs at least one function or operation and may be implemented with hardware, software, or a combination thereof. "plurality of modules", or "plurality of units" may be implemented with at least one processor by integrating the modules or units into at least one module other than "modules" or "units" which need to be implemented with specific hardware.

It will be understood that when an element (for example, a first element) is referred to as being "coupled with/to" or "connected to" another element (for example, a second element), it can be directly connected or coupled to the other element or intervening elements (for example, third elements) may be present.

In an embodiment, the user input may include at least one of a touch input, a bending input, a voice input, a button input, and a multimodal input, but this is not limited thereto.

Unless otherwise defined, all terms (including technical and scientific terms) used herein have the same meaning as commonly understood by one of ordinary skill in the art to which this inventive concept belongs. Terms defined in general dictionaries among the terms used herein may be interpreted to have the same meaning as or the similar meaning to the contextual meaning in the related art. Unless otherwise defined, the terms used herein may not be interpreted to have the ideal or overly formal meaning.

Hereinafter, the present invention will be described with reference to the drawings. FIG. 1 is a diagram illustrating a configuration of an electronic device according to an embodiment of the present invention. As illustrated in FIG. 1, an electronic device 100 includes a storage unit 110, a display unit 120, and a control unit 130. The electronic device 100 according to an embodiment of the present invention may be implemented with various electronic devices such as a smart phone, a tablet PC, a laptop PC, a desktop PC, and the like.

The storage unit 110 stores various modules configured to drive the electronic device 100. For example, the storage unit 110 may store software including a UI rendering module, a secure indicator detector module, a display control module, a base module, a sensing module, a communication module, a presentation module, a web browser module, and a service module.

In particular, the storage unit 110 stores data of a reference secure indicator. The storage unit 110 stores data for a secure indicator displayed in a secure mode as the data of the reference secure indicator.

The display unit 120 outputs image data. In particular, the display unit 120 displays a secure indicator drawn in a normal mode. In response to the secure indicator being determined as a forged secure indicator, the display unit 120 displays a warning phrase for notifying that the secure indicator is a forged secure indicator.

The control unit 130 controls an overall operation of the electronic device 100. In particular, the control unit 130 may determine whether or not a secure indicator displayed in the normal mode is forged by comparing data of the secure indicator displayed in the normal mode and data of the reference secure indicator stored in the storage unit 110. In response to the secure indicator being determined as the forged secure indicator, the control unit 130 generates an event notifying that the secure indicator is forged.

For example, the control unit 130 controls the display unit 120 to display a UI including a secure indicator displayed in the normal mode.

The control unit 130 may determine whether or not the secure indicator is forged by comparing the data of the secure indicator displayed in the normal mode and the data of the reference secure indicator stored in the storage unit 110 through various methods.

For example, the control unit 130 may detect data of a frame buffer used for displaying a UI using UI-related information corresponding to the displayed UI and determine whether or not the secure indicator is forged by comparing the detected data and the data of the reference secure indicator.

In another example, the control unit 130 may detect data of a frame buffer corresponding to an uppermost layer among a plurality of layers and data of a frame buffer used for displaying the secure indicator and determine whether or not the secure indicator is forged by comparing only the detected data with the data of the reference secure indicator. In this example, in response to several elements having different movements or effects from each other in one screen, images separated from each other may be displayed to overlap each other. The overlaying layers refers to layers.

In another example, in response to a position in which the secure indicator is displayed in a display screen being fixed or being shifted in a regular rule, the control unit 130 may detect data only from a frame buffer corresponding to a layer region corresponding to a fixed position in which the secure indicator is displayed or a shifted position in which the secure indicator is shifted in a regular rule. The control unit 130 may determine whether or not the secure indicator is forged by comparing the detected data and the data of the reference secure indicator.

In response to the secure indicator being determined as a forged secure indicator through the above-described methods, the control unit 130 may generate a warning event. For example, the control unit 130 may control the display unit 120 to display a warning phrase or may control an audio output unit to output a warning sound.

In response to a specific event being generated, the control unit 130 may update UI-related information. The specific event may be one of fixed period arrival, user command input for determining whether or not the secure indicator is forged, UI generation including the secure indicator, and UI updating including the secure indicator.

Figure 2:
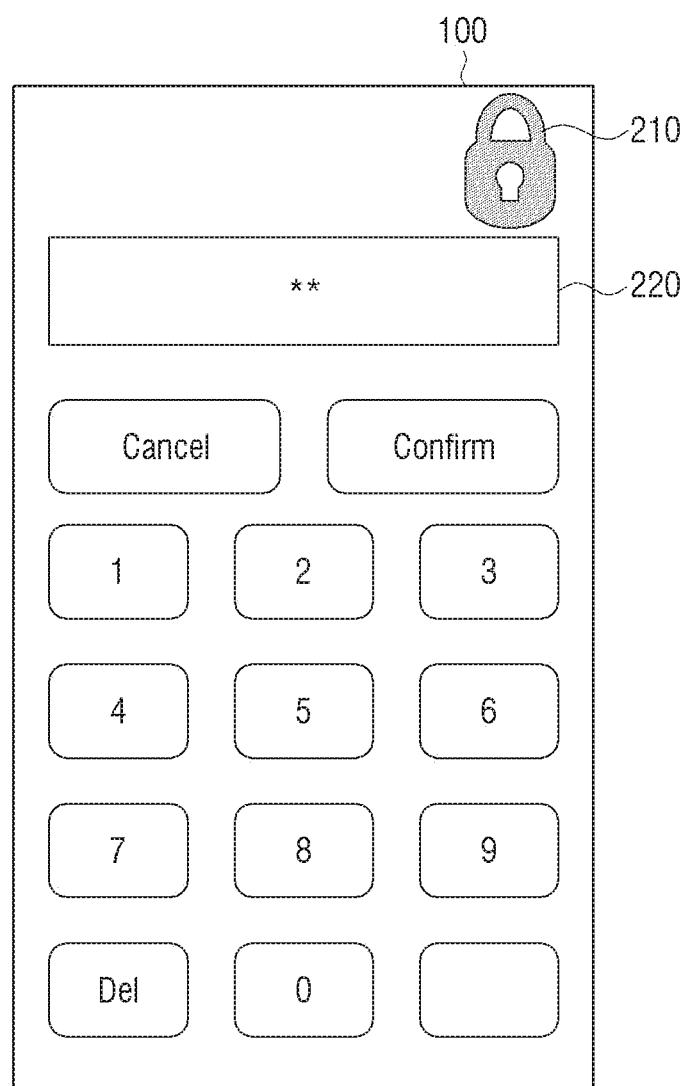
FIG. 2 is a diagram illustrating an example of displaying a UI including a secure indicator according to an embodiment of the present invention.

FIG. 2 illustrates the electronic device 100 which displays a UI including a secure indicator 210 according to an embodiment of the present invention. In response to an operation requiring security such as a password input 220 being performed through application execution requiring security such as a bank application, the electronic device 100 may indicate that the electronic device 100 operates in a secure mode simultaneously by displaying the secure indicator 210. Although an icon is illustrated as the secure indicator 210 in FIG. 2, this is merely exemplary and an image, text, and the like may be used as the secure indicator.

In response to the secure indicator displayed in the normal mode being determined as a forged secure indicator, as illustrated in FIGS. 3A to 3E, the electronic device 100 may generate a warning event.

Figure 3A:
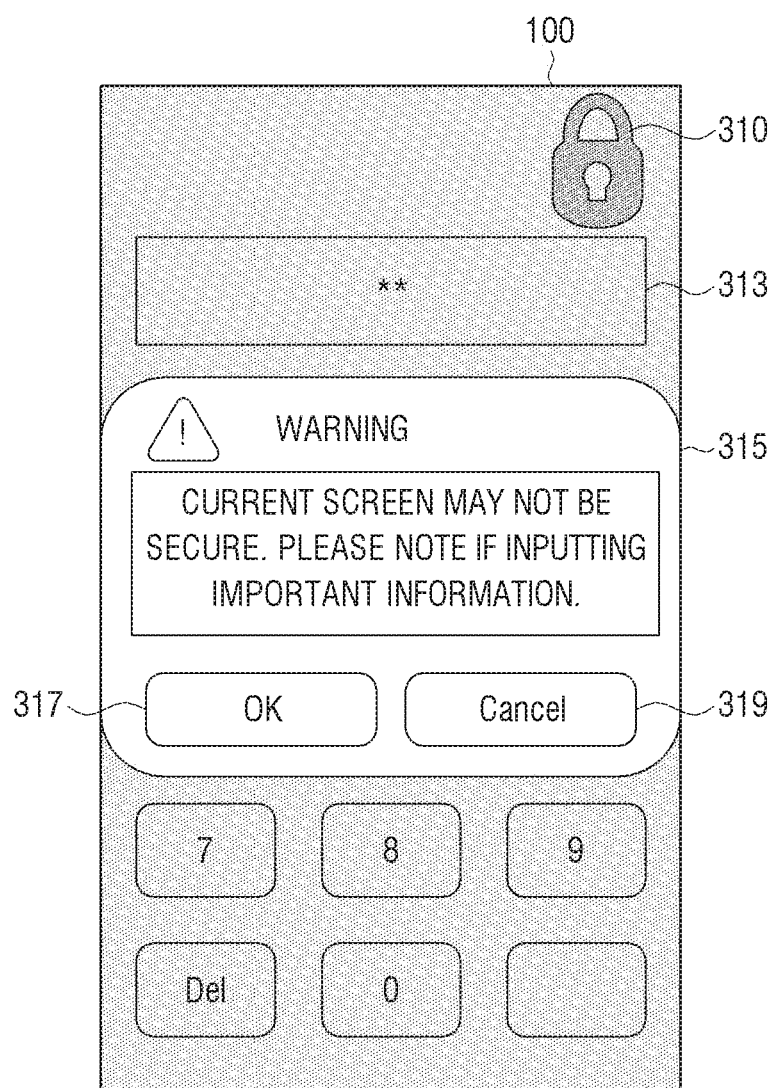
FIGS. 3A to 3E are diagrams illustrating examples of generating a warning event according to various embodiments of the present invention.

For example, as illustrated in FIG. 3A, the electronic device 100 may display a warning phrase 315 that 'A current screen may not be secure. Please note if inputting important information.'. In response to a user command, for example, OK 317 being input, the electronic device 100 may maintain an input operation of a password 313. In response to a user command, for example, Cancel 319 being input, the electronic device 100 may terminate an executing application.

Figure 3B:
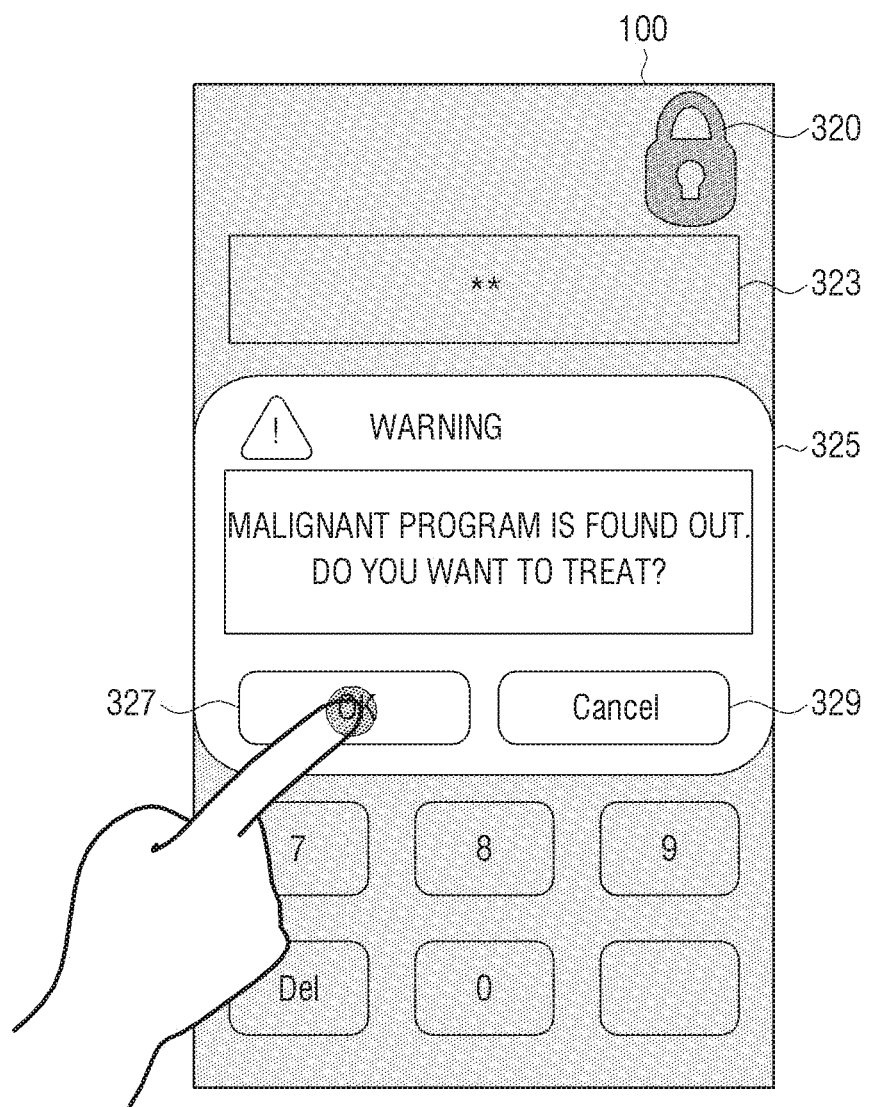
Figure 3C:
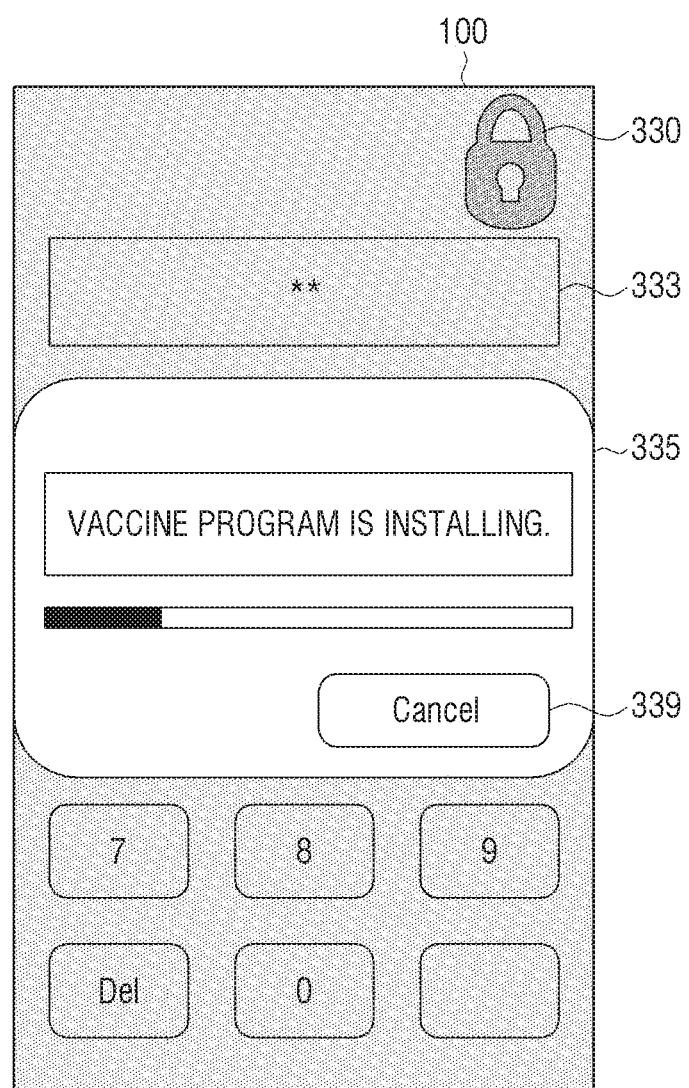

In another example, as illustrated in FIG. 3B, the electronic device 100 may display a phrase 325 that 'A malignant program is found out. Do you want to treat?'. In response to a user command, for example, OK 327 being input, the electronic device 100 may treat the malignant program using a vaccine program or may install the vaccine program if necessary as illustrated in FIG. 3C. In response to a user command, for example, Cancel 329 being input, the electronic device 100 may display a phrase for inquiring whether or not to terminate an executing application.

Figure 3D:
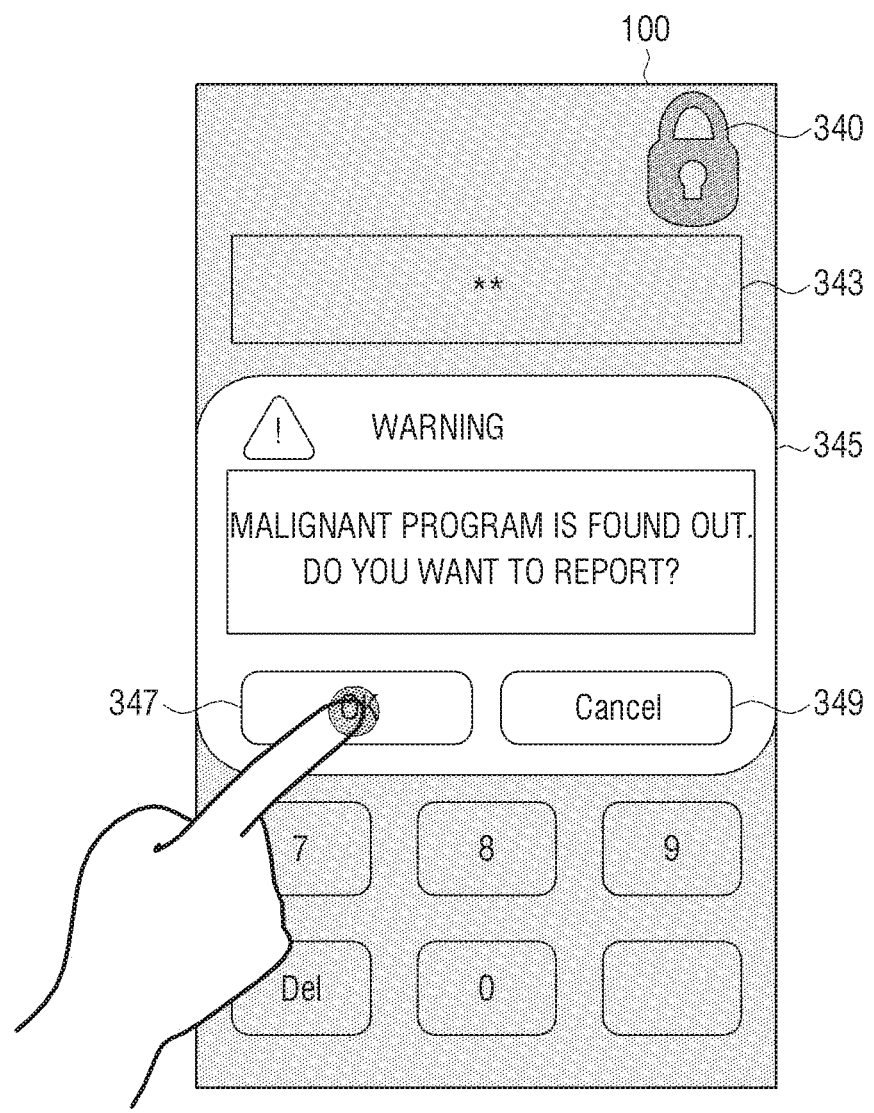
Figure 3E:
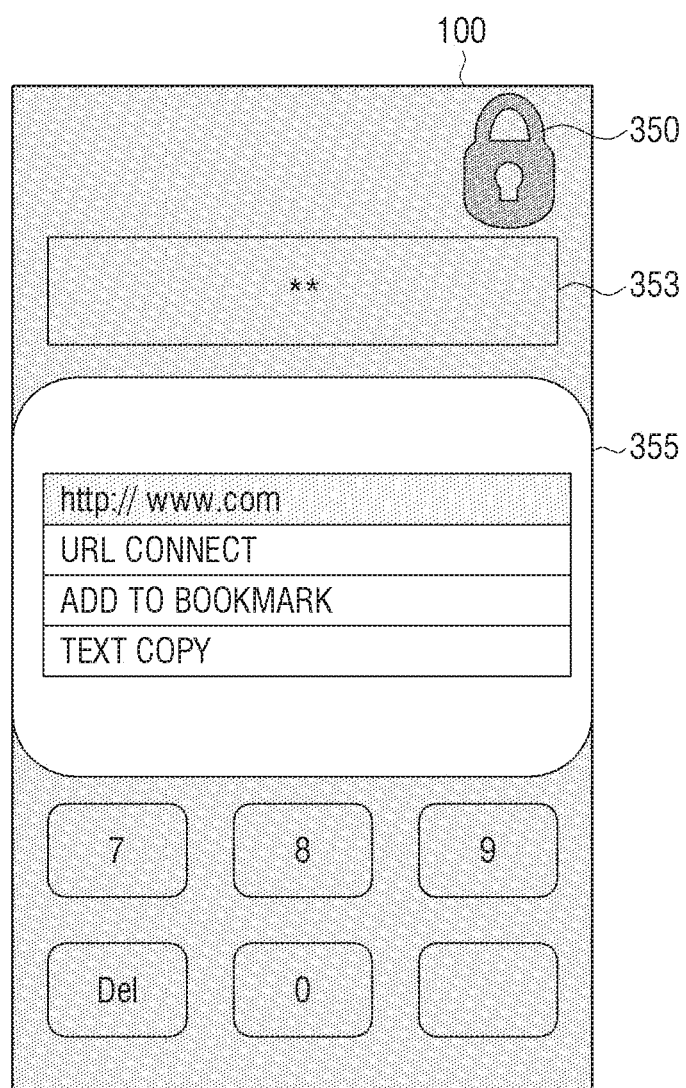

In another example, as illustrated in FIG. 3D, the electronic device 100 may display a phrase 345 that 'A malignant program is found out. Do you want to report?'. In response to a user command, for example, OK 347 being input, the electronic device 100 may display a universal resource locator (URL) address 355 which can report the malignant program as illustrated in FIG. 3E. In response to a user command, for example, Cancel 349 being input, the electronic device 100 may display a phrase for inquiring whether or not to terminate an executing application.

The example that in response to the secure indicator displayed in the normal mode being determined as a forged secure indicator, the electronic device 100 displays the warning phrase 315 is merely exemplary and this is not limited thereto. For example, the electronic device 100 may output a warning sound, may generate specific pattern vibration, may not receive a user input, may forcibly terminate a using application, or may delete the forged secure indicator.

Figure 4:
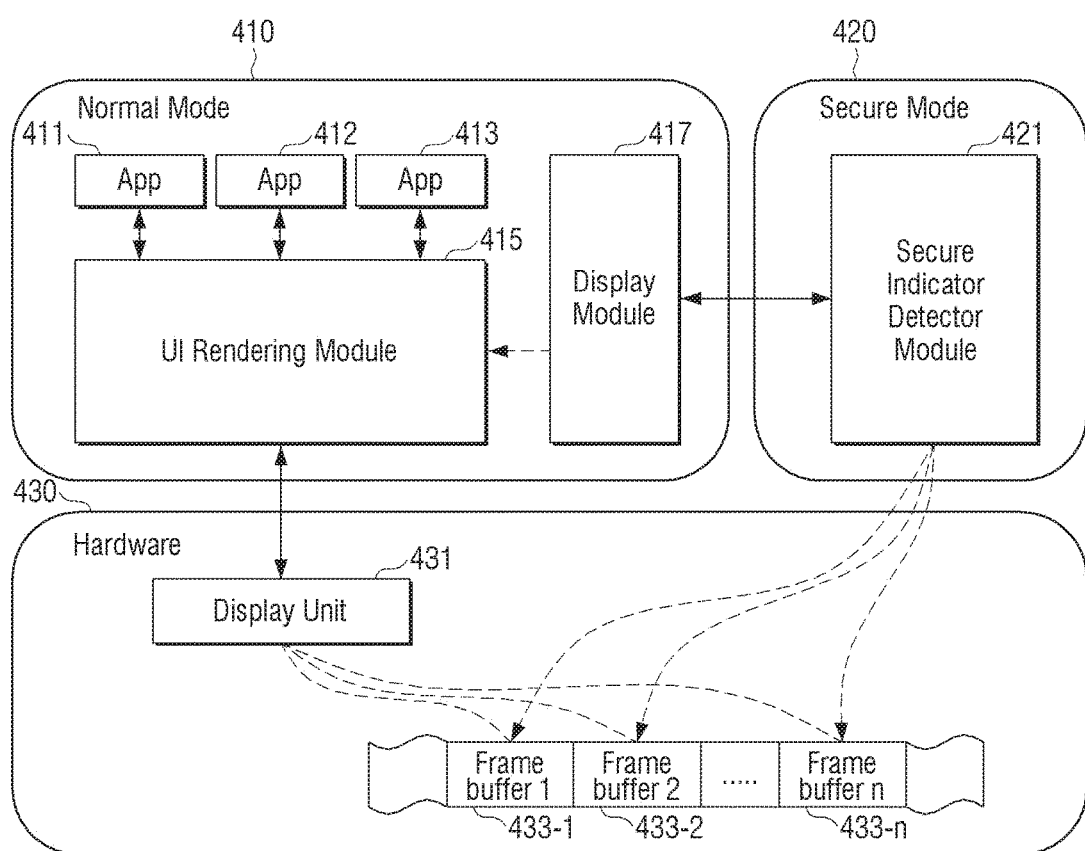
FIGS. 4 to 7 are diagrams explaining operation methods of the present invention according to various embodiments of the present invention.
Figure 5:
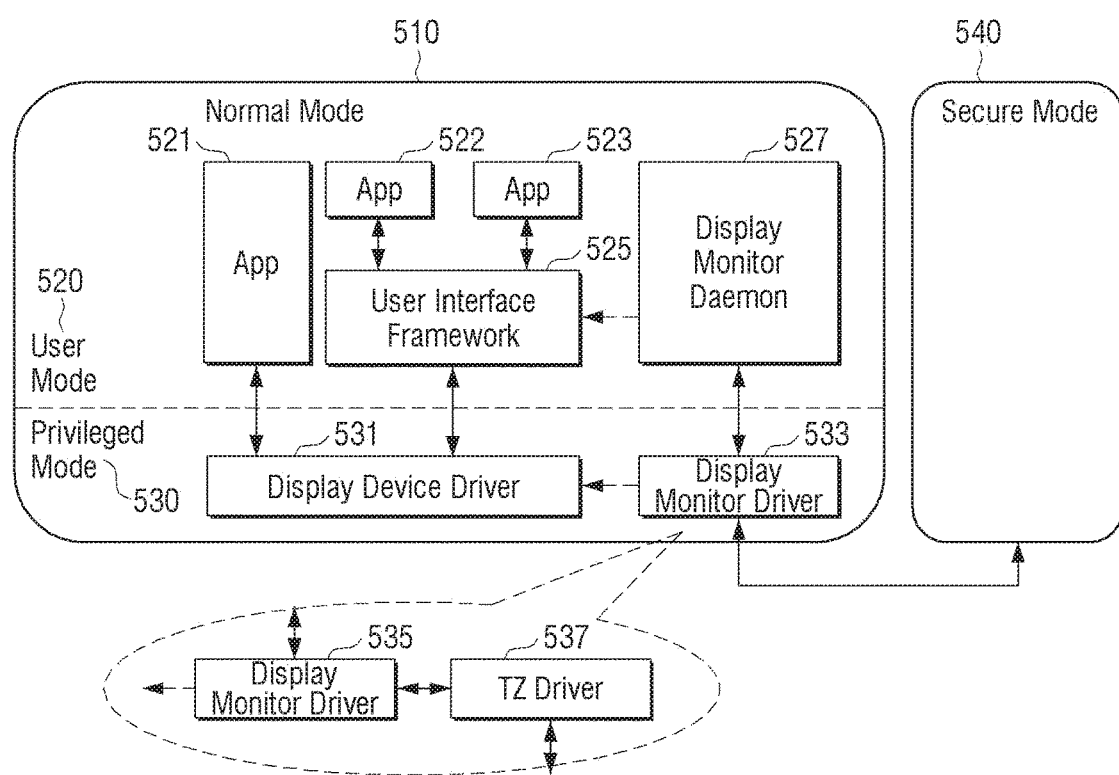
Figure 6:
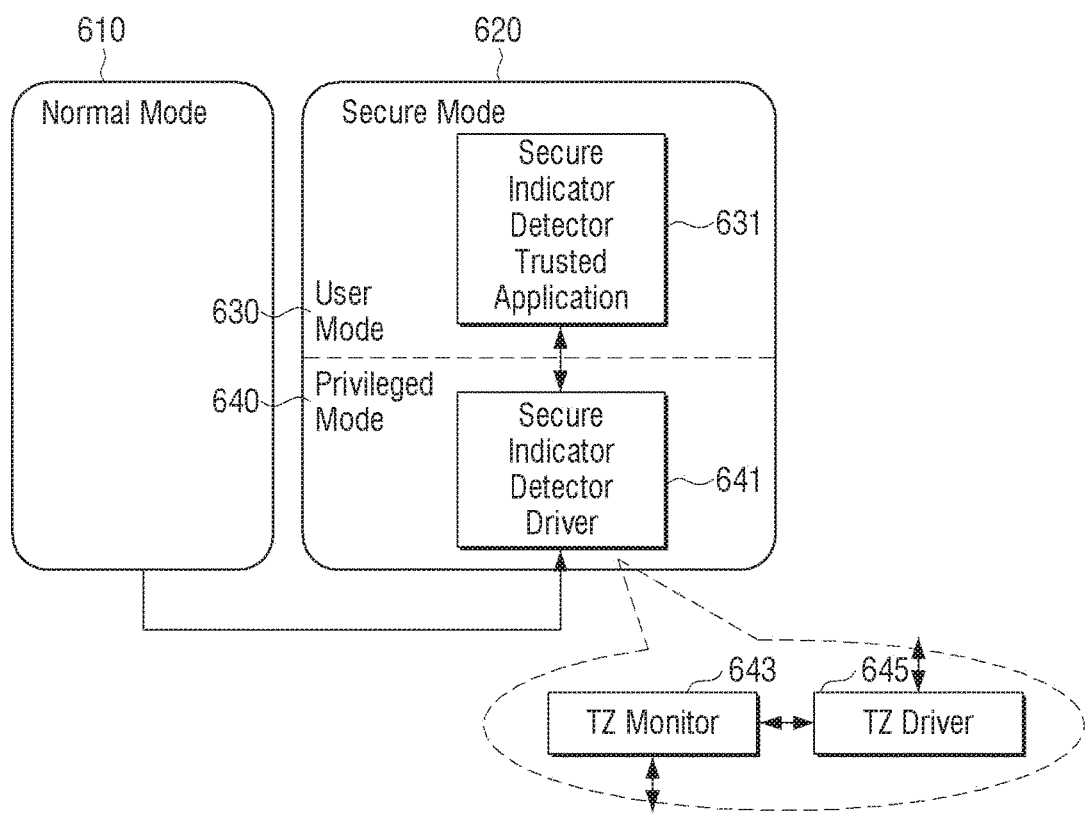
Figure 7:
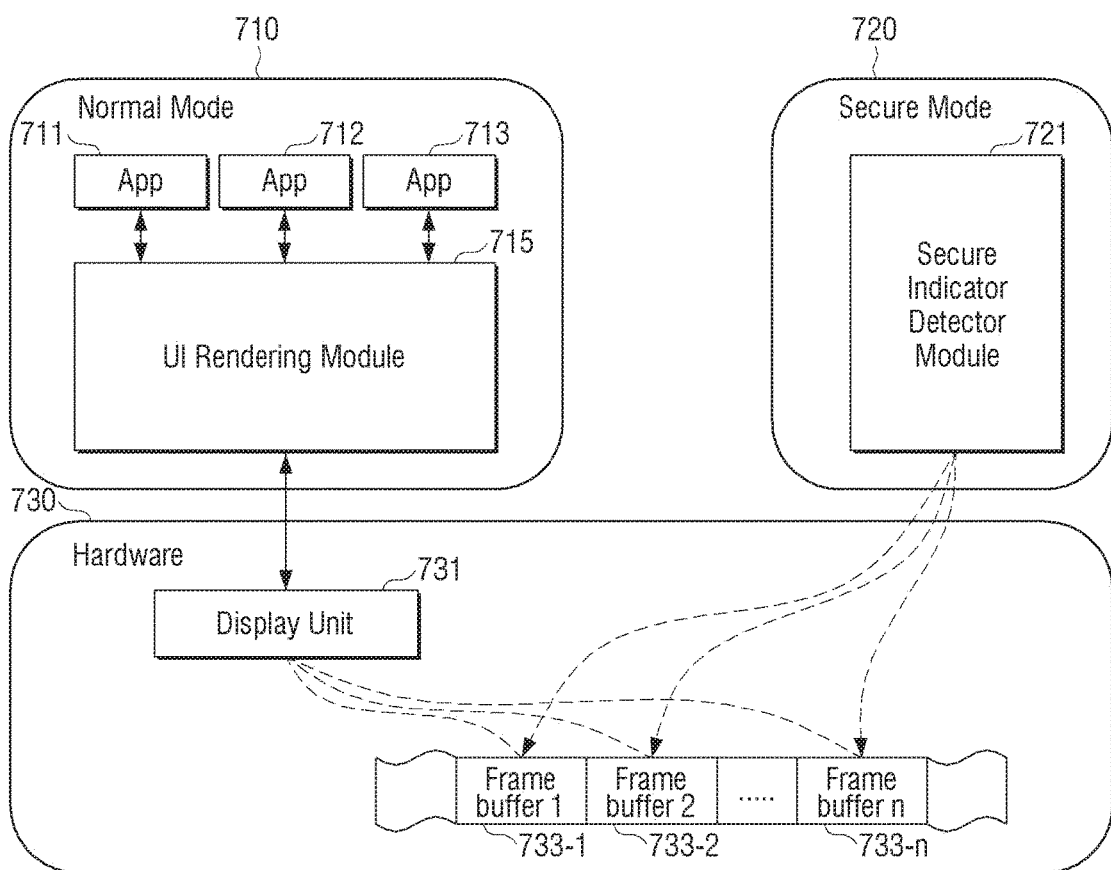

An operation method for determining whether or not the secure indicator displayed in the normal mode is forged in the electronic device 100 according to various embodiments of the present invention will be described with reference to FIGS. 4 to 7. FIG. 4 illustrates a basic configuration according to an embodiment of the present invention and FIGS. 5 to 7 illustrate configurations of various embodiments partially modified from FIG. 4 and thus the operation method will be described on the basis of a difference between the configuration of FIG. 4 and the configurations of FIGS. 5 to 7.

As illustrated in FIG. 4, a normal mode 410 which is a software platform (for example, Android and the like) in which general applications 411, 412, and 413 operate and a secure mode 420 which is a software platform in which an application requiring security operates may be provided in one central processing unit (CPU).

The applications 411, 412, and 413 refer to programs which may interact with the user by displaying a UI in a screen of the electronic device 100 using a UI rendering module 415. The applications 411, 412, and 413 may be applications including a malignant program that forges and use the secure indicator.

The UI rendering module 415 may allow the applications 411 to 413 to draw and use a UI. The UI rendering module 415 may control the display unit 120 to display the UI by controlling frame buffers 433-1, 433-2, and 433-n and a plurality of layers.

A display module 417 acquires UI-related information, transfers the acquired UI-related information to a secure indicator detector module 421, and receives a determination result of the secure indicator detector module 421. In response to a forged secure indicator being displayed using the received determination result, the display module 417 may control the display unit 120 to display a phrase for notifying that the secure indicator is a forged secure indicator.

The secure indicator detector module 421 detects data stored in the frame buffers 433-1, 433-2, and 433-n used in the electronic device 100 and determine whether or not the secure indicator is forged by comparing the detected data and the data of the reference secure indicator. The secure indicator detector module 421 may determine whether or not the secure indicator is forged by comparing shapes, forms, colors, chromes, brightness, a combination thereof, or the like between the secure indicator displayed in the normal mode and the reference secure indicator through the detected data. The secure indicator detector module 421 transmits a forge determination result of the secure indicator to the display module 417.

A hardware 430 may include the frame buffers 433-1, 433-2, and 433-n. A display controlling module 431 may be provided on the hardware 430. The display controlling module 431 may display a screen by reading the data stored in the frame buffers 433-1, 433-2, and 433-n included in the hardware 430.

The display controlling module 431 may determine layers corresponding to the frame buffers through data stored in the frame buffers 433-1, 433-2, and 433-n and display one screen through overlapping of the layers.

Referring to FIG. 5 which illustrates another embodiment of the present invention, a user mode 520 which is not a protection mode but an execution mode and a privileged mode 350 which is one of execution modes supported by the protection mode may be divided in a normal mode 510.

In the embodiment, the above-described UI rendering module 415 may have a structure which is divided into a UI framework 525 which operates in the user mode 520 and a display device driver 531 which operates in the privileged mode 530. For example, the UI framework 525 may allow applications 522 and 523 to generate UIs. A display monitor driver 533 may control a frame buffer and a layer and may control a correspondence relationship between the frame buffer and the layer. The display monitor driver 533 may control the display controlling module 431.

The above-described display module 417 may have a structure that is divided into a display monitor daemon 527 which operates in the user mode 520 and the display monitor driver 533 which operates in the privileged mode 530. The display monitor daemon 527 may acquire UI-related information which may be acquired in the user mode 520 and update the UI-related information. The display monitor driver 533 may acquire UI-related information which may be acquired in the privileged mode 530 and update the UI-related information. In response to the UI-related information being acquired in the display monitor daemon 527 and the display monitor driver 533, the display monitor driver 533 may transmit the acquired information to the secure indicator detector module of a secure mode 540.

This is merely exemplary and all the functions of the display module 417 in FIG. 4 may be performed even in response to only one of the display monitor daemon 527 and the display monitor driver 533 being provided. For example, in the structure that only the display monitor daemon 527 is provided, a TZ driver 537 may be provided in the privileged mode 530 in order for the display monitor daemon 527 to perform communication with the secure mode 540. The display monitor driver 533 may have a structure that is divided into the display monitor driver 535 and the TZ driver 537 which may communicate with the secure mode 540.

Although FIG. 5 illustrates the example of the structure that the normal mode 510 is divided into the user mode 520 and the privileged mode 530, FIG. 6 illustrates an example of a structure that a secure mode 620 is divided into a user mode 630 and a privileged mode 640. The secure indicator detector module 421 described in FIG. 4 may have a structure that is divided into a secure indicator detector trusted application 631 which operates in the user mode 630 and a secure indicator detector driver 641 which operates in the privileged mode 640. The secure indicator detector trusted application 631 may determine whether or not the secure indicator is forged by determining data stored in a frame buffer using the UI-related information received in a normal mode 610. The secure indicator detector driver 641 may transmit and receive information of the normal mode to and from the secure indicator detector trusted application 631.

Only one of the secure indicator detector trusted application 631 and the secure indicator detector driver 641 may be provided to perform all the functions of the secure indicator detector module 421 of FIG. 4. For example, in the structure that only the secure indicator detector trusted application 631 is provided, a TZ driver 645 may be provided in the privileged mode 640 in order for the secure indicator detector trusted application 631 to perform communication with the normal mode.

FIG. 7 illustrates a configuration for determining whether or not a secure indicator displayed in a normal mode is forged only through a module which operates in a secure mode 720. A secure indicator detector module 721 may access all frame buffers 733-1, 733-2, and 733-n. In response to data similar to the data of the reference secure indicator being present by determining data stored in the frame buffers 733-1, 733-2, and 733-n, the secure indicator detector module 721 determines the secure indicator displayed in the normal mode as a forged secure indicator.

The secure indicator detector module 721 may operate in response to a specific event being generated in hardware. For example, the event may be arrival of a certain period or input of an interrupt such as a touch and the like. The secure indicator detector module 721 may operate by itself or may operate through other modules.

In response to the use of the forged secure indicator being detected through the operation of the secure indicator detector module 721, the secure indicator detector module 721 may control the display unit to display a warning phrase using the display controlling module. Although the warning phrase is displayed in the embodiment, this is merely exemplary, and the secure indicator detector module 721 may control an audio output unit to output a warning sound, may forcibly terminate a currently executing application, or may not receive a user input. The secure indicator detector module 721 may generate the warning event using other electronic devices.

A method of determining whether or not a secure indicator displayed in the normal mode is forged in a secure indicator detector module 800 will be described in detail with reference to FIGS. 8 to 11. The secure indicator detector module 800 may access all the frame buffers, and thus the secure indicator detector module 800 may determine the data stored in all the frame buffers used in the electronic device 100. In response to data similar to the data of the reference secure indicator among the data stored in the frame buffers being present, the secure indicator is determined as a forged secure indicator. It has been described that five frame buffers are exemplified in FIGS. 8 to 11, but the number of usable frame buffers and a method of allocating a frame buffer may be varied according to the electronic device 100. It has illustrated that a first buffer is corresponding to a layer 1, but the layer corresponding to the frame buffer may be dynamically changed.

Figure 8:
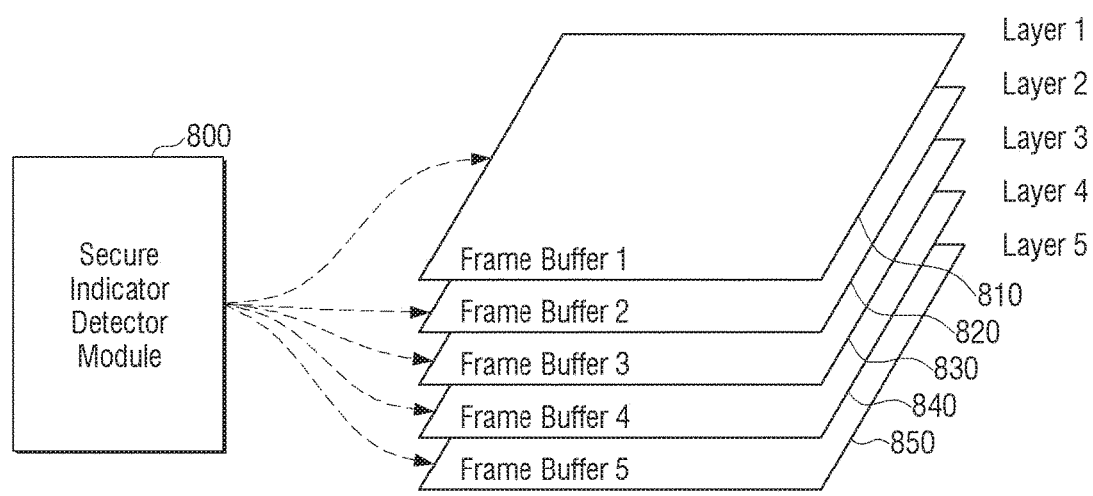
FIGS. 8 to 11 are diagrams explaining methods of determining whether or not a secure indicator is forged in a secure indicator detector module according to various embodiments of the present invention.

Referring to FIG. 8, the secure indicator detector module 800 determines whether or not data similar to the data of the reference secure indicator is present by determining all data stored in a first frame buffer 810 to a fifth frame buffer 850. In response to the data similar to the data of the reference secure indicator being present, the secure indicator detector module 800 determines the secure indicator displayed in the normal mode as a forged secure indicator.

Figure 9:
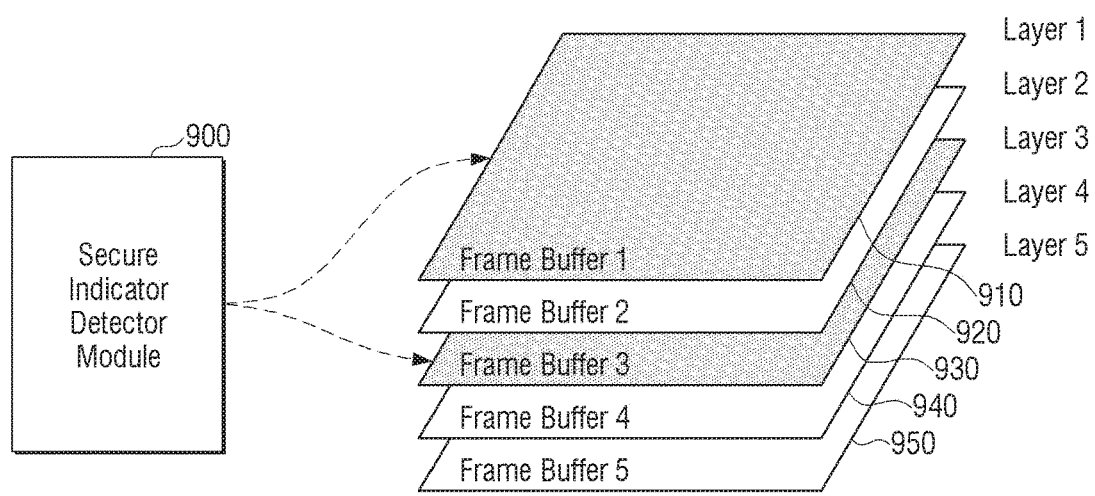
Figure 10:
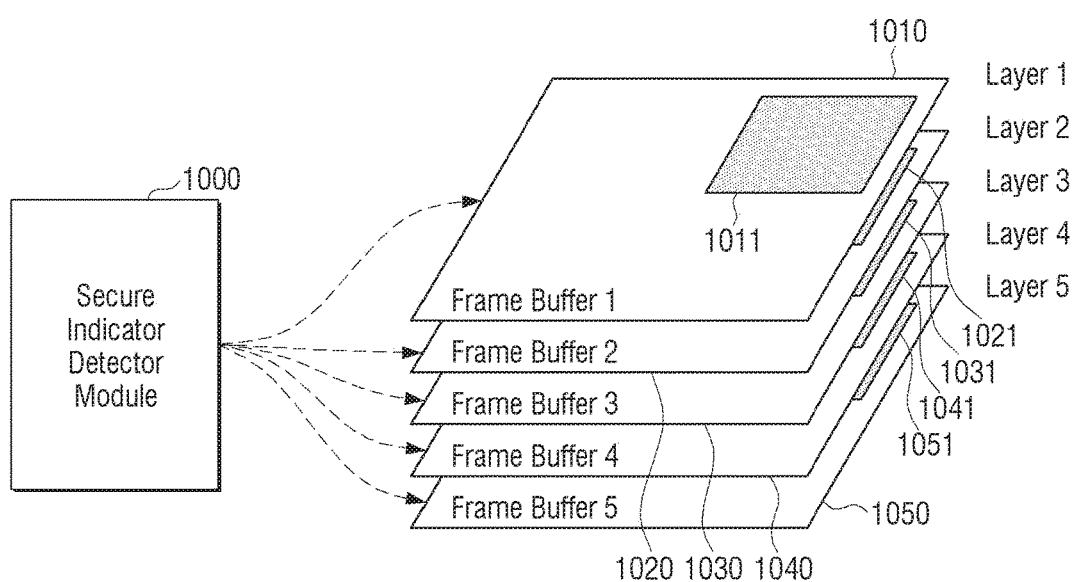
Figure 11:
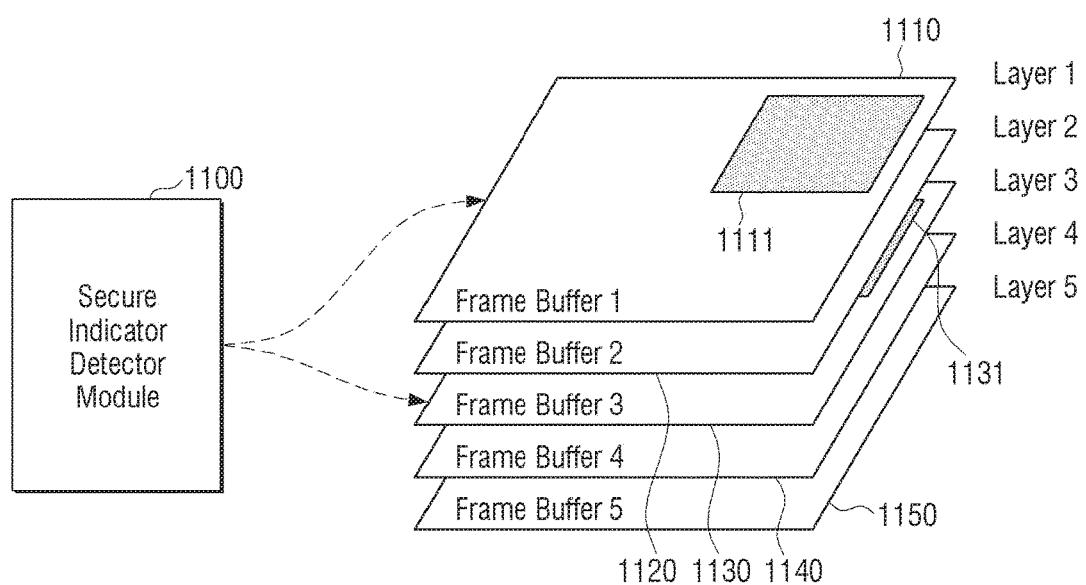

FIGS. 9 to 11 illustrate examples of determining whether or not a secure indicator is forged faster than the method of determining whether or not the secure indicator displayed in the normal mode is forged as described in FIG. 8 by determining only partial frame buffers in the secure indicator detector module. In FIGS. 9 to 11, a layer 1 is an uppermost layer and a layer 3 is a layer used in a currently executing application. However, this is merely exemplary and this is not limited thereto.

Contents of the uppermost layer is preferentially displayed rather than contents of lower layers and thus the electronic device 100 displays a forged secure indicator in response to data for a forged secure indicator being present in a first frame buffer 910 corresponding to the uppermost layer. In response to an executing application being a malignant program using a forged secure indicator, the forged secure indicator is present in a third frame buffer 930 in which UI-related information corresponding to a UI of the application is stored. As illustrated in FIG. 9, the secure indicator detector module 900 may determine whether or not the secure indicator is forged by comparing the data of the reference secure indicator only with data of the first frame buffer 910 corresponding to an uppermost layer among the first frame buffer 910 to a fifth frame buffer 950 and data of the third frame buffer 930 corresponding to a layer 3 used in the executing application.

In response to the secure indicator being displayed in a fixed position on a screen in which a UI is displayed, as illustrated in FIG. 10, a secure indicator detector module 1000 may determine whether or not the secure indicator is forged by comparing the data of the reference secure indicator only with data of regions 1011 to 1051 corresponding to the fixed position, in which the secure indicator is displayed, in a first frame buffer 1010 to a fifth frame buffer 1050.

A secure indicator detector module 1100 according to another embodiment of the present invention may determine whether or not the secure indicator is forged using both the method described in FIG. 9 and the method described in FIG. 10. For example, the secure indicator detector module 1100 may determine whether or not the secure indicator is forged by comparing the data of the reference secure indicator only with data of a region 1111 corresponding to a fixed position, in which the secure indicator is displayed, in a first frame buffer 1110 corresponding to an uppermost layer and data of a region 1131 corresponding to the fixed position, in which the secure indicator is displayed, in a third frame buffer 1130 corresponding to a layer 3 used in an executing application.

Figure 12:
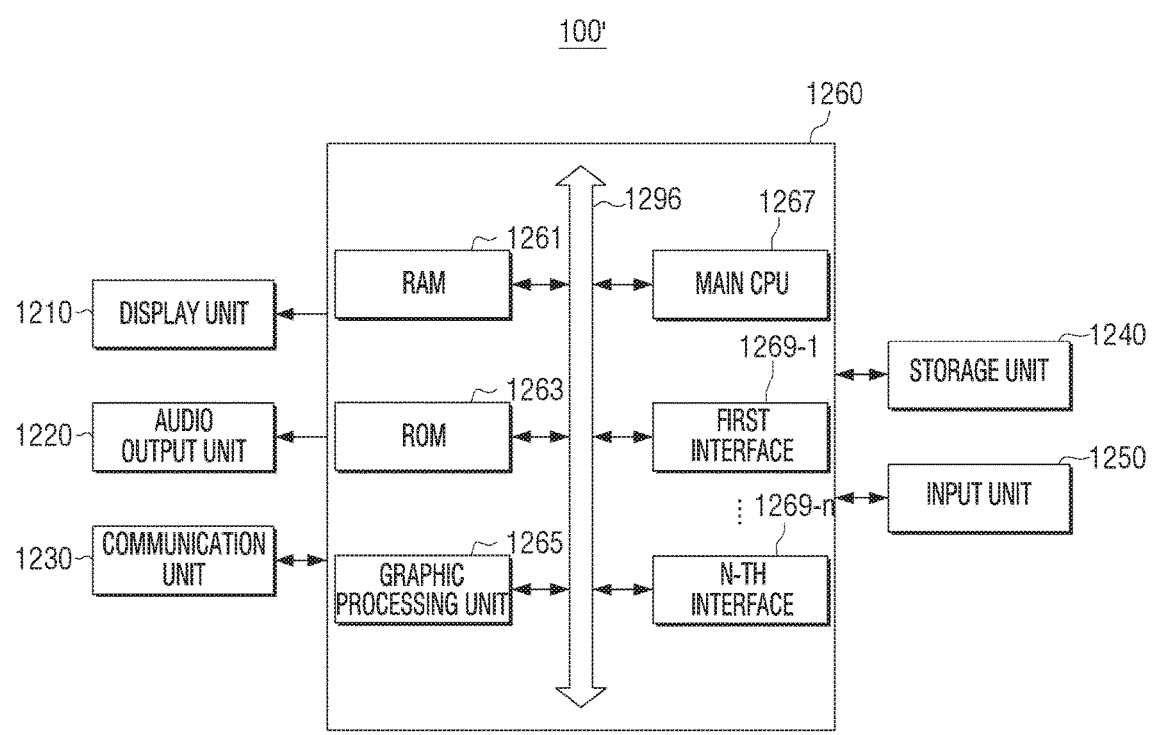
FIG. 12 is a detailed block diagram illustrating a configuration of an electronic device according to an embodiment of the present invention.

FIG. 12 illustrates a detailed block diagram illustrating the electronic device 100 according to an embodiment of the present invention. In some embodiments, a portion of elements of the electronic device illustrated in FIG. 12 may be omitted or changed or other elements may be further added to the electronic device illustrated in FIG. 12.

A display unit 1210 displays at least one of video frames in which image data received from an image receiving unit (not shown) is processed in an image processing unit (not shown) and various screens generated in a graphic processing unit 1265. For example, the display unit 1210 may display a UI including a secure indicator indicating that the electronic device 100 operates in the secure mode. In response to the secure indicator displayed in the normal mode being a forged secure indicator, the electronic device 100 may display a warning phrase indicating that the secure indicator is the forged secure indicator. The example that the electronic device 100 displays the warning phrase to warn the forged secure indicator is merely exemplary and this is not limited thereto.

An audio output unit 1220 may be a configuration which outputs various types of audio data on which various processing tasks such as decoding, amplification, noise filtering, and the like are performed in an audio processing unit (not shown) as well as various types of alert sounds or voice messages. For example, the audio output unit may output a warning sound or a warning message to notify that the secure indicator is the forged secure indicator. The audio output unit 1220 may be implemented with a speaker, but this is merely exemplary and the audio output unit 1220 may be implemented with an output terminal which may output audio data.

A communication unit 1230 is a configuration which performs communication with various types of external apparatuses according to various types of communication methods. The communication unit 1230 may include various communication chips such as a WIFI chip, a Bluetooth chip, a near field communication (NFC) chip, a wireless communication chip, and the like.

A storage unit 1240 stores various modules configured to drive the electronic device 100. For example, software including a base module, a communication module, a presentation module, a web browser module, and a service module may be stored in the storage unit 1240. In this example, the base module is a basic module which processes signals transferred from pieces of hardware included in the electronic device 100 and transfers the processed signals to an upper layer module. The presentation module is a module configured to form a display screen and may include a multimedia module configured to reproduce and output multimedia content, a UI rendering module configured to perform UI and graphic processing, a display module, a display controlling module, a display device driver module, a UI framework module, and the like. The communication module is a module configured to perform communication with the outside. The web browser module refers to a module configured to access a web server by performing web browsing. The service module is a module including various types of applications for providing various types of service.

As described above, the storage unit 1240 may include various program modules, but a portion of the various types of program modules may be omitted or modified according to a type and characteristic of the electronic device 100 or other program modules may be added according to the type and characteristic modules. For example, in response to the electronic device 100 being implemented with of a tablet PC, a position determination module configured to determine a global positioning system (GPS)-based position may be further included in the base module, and a sensing module configured to detect a motion of the user may be further included in the sensing module.

For example, the storage unit 1240 stores the data of the reference secure indicator. In this example, the storage unit 1240 store data of a secure indicator displayed in the secure mode as the data of the reference secure indicator.

In an embodiment of the present invention, the storage unit 1240 may be defined by including a read only memory (ROM) 1263 or a random access memory (RAM) 1261 in a control unit 1260 or a memory card (not shown) (for example, a micro secure digital (SD) card, a memory stick) mounted on the electronic device 100.

The control unit 1260 controls an overall operation of the electronic device 100 using various types of program stored in the storage unit 1240.

As illustrated in FIG. 12, the control unit 1260 includes the RAM 1261, the ROM 1263, the graphic processing unit 1265, a main CPU 1267, first to n-th interfaces 1269-1 to 1269-n, and a bus 1296. The RAM 1261, the ROM 1263, the graphic processing unit 1265, the main CPU 1267, the first to n-th interfaces 1269-1 to 1269-n, and the like may be coupled to each other through the bus 1296.

A command set for system booting and the like are stored in the ROM 1263. In response to power being supplied through input of a turn-on command, the main CPU 1267 copies an operating system (O/S) stored in the storage unit 1240 in the RAM 1261 according to a command stored in the ROM 1263 and executes the O/S to boost the system. In response to the booting being completed, the main CPU 1267 copies various types of application programs stored in the storage unit 1240 in the RAM 1261 and performs various operations by executing the application programs copied in the RAM 1261.

The graphic processing unit 1265 generates a screen including various objects such as a pointer, an icon, an image, text, and the like using an operation unit (not shown) and a rendering unit (not shown). The operation unit calculates attribute values such as such as coordinate values in which the objects are to be displayed, shapes, sizes, colors, and the like according to a layout of the screen using a control command received from an input unit. The rendering unit generates various layouts of screens including an object based on the attributed values calculated in the operation unit. The screens generated in the rendering unit are displayed in a display region of the display unit 1210.

The main CPU 1267 accesses the storage unit 1240 to perform booting using the O/S stored in the storage unit 1240. The main CPU 1267 performs various operations using various types of program, content, data, and the like stored in the storage unit 1240.

The first to n-th interfaces 1269-1 to 1269-n are coupled to the above-described elements. One of the interfaces may be a network interface coupled to an external apparatus through a network.

For example, in response to a UI including a secure indicator displayed in the normal mode being displayed, the control unit 1260 determines whether or not the secure indicator displayed in the normal mode is forged. In response to the secure indicator displayed in the normal mode being determined as a forged secure indicator, the control unit 1260 generates a warning event indicating that the forged secure indicator is displayed. The warning event may be warning phrase display, warning sound output, non-reception of a user input, forcible termination of a using application, and a combination thereof.

For example, the control unit 1260 may detect data of a frame buffer used for displaying a UI using UI-related information corresponding to the UI and determine whether or not the secure indicator displayed in the normal mode is forged by comparing the detected data and the data of the reference secure indicator.

The control unit 1260 may detect only data of a frame buffer corresponding to an uppermost layer among a plurality of layers and data of a frame buffer corresponding to a layer used for displaying a secure indicator and determine whether or not the secure indicator displayed in the normal mode is forged by comparing the detected data and the data of the reference secure indicator.

In response to a position in which the secure indicator is displayed on a UI being fixed, the control unit 1260 may detect only data of frame buffers corresponding to layer regions corresponding to the fixed position in which the secure indicator is displayed and determine whether or not the secure indicator displayed in the normal mode is forged by comparing the detected data and the data of the reference secure indicator.

According to various embodiments of the present invention, the control unit 1260 may include a CPU and as illustrated in FIGS. 4 to 7, the software of the normal mode and the secure mode may be driven in the CPU. The control unit 1260 may be an ARM chip, an application processor, and the like.

Figure 13:
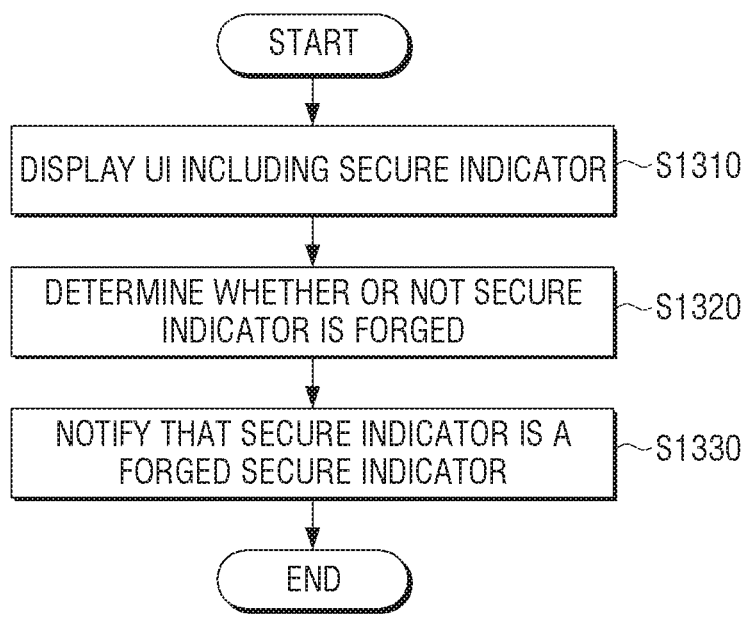
FIG. 13 is a flowchart explaining a control method of an electronic device according to an embodiment of the present invention.

Hereinafter, a method of determining whether or not a secure indicator displayed in a normal mode is forged in the electronic device 100 according to an embodiment of the present invention will be described with reference to FIG. 13.

First, the electronic device 100 displays a UI including a secure indicator displayed in the normal mode (S1310).

The electronic device 100 determines whether or not the secure indicator displayed in the normal mode is forged (S1320). For example, the electronic device 100 may detect data of a frame buffer used for displaying a UI using UI-related information of a displayed UI and determine whether or not the secure indicator is forged by comparing the detected data and the data of the secure indicator.

The UI-related information may include at least one of using application information, layer information used in the using application, a memory address and a size of a using frame buffer, an address and a size of a memory (a spare reserved memory) to be used as the frame buffer, and layer information corresponding to the frame buffers.

The UI-related information may be updated in certain period arrival, at a point of non-periodically certain time, in request of UI generation of an executing application, in request of UI updating of the executing application, in generation of UI according to a request of the executing application, in generation of an interrupt related to a display output (for example, vsync interrupt, hsync interrupt, blank, unblank, and the like) and the like.

In response to the secure indicator displayed in the normal mode being determined as a forged secure indicator, the electronic device 100 may notify that the secure indicator is a forged secure indicator (S1330). The electronic device 100 may notify that the secure indicator is the forge secure indicator by displaying a warning phrase, outputting an alert sound, receiving no user input, or forcibly terminating a using program.

The above-described method may be implemented in a general-purpose digital computer which may create program executable in a computer and operate the program using a computer-readable recording medium. Further, the data structure used in the above-described method may be recorded in the computer-readable recoding medium through various means. The computer-readable recording medium includes a storage medium such as a magnetic storage medium (for example, ROM, RAM, floppy disc, hard disc, and the like) and an optical reading medium (for example, CD ROM, digital versatile disc (DVD), and the like).

In various embodiments of the present invention as described above, in response to a UI including a forged secure indicator being displayed, the user may be notified that the forged secure indicator is using and may be free from the risk of the leakage of important information (for example, password). Further, through the present invention, forging of the secure indicator may be prevented and leakage and use of the secure indicator may be prevented.

The foregoing exemplary embodiments and advantages are merely exemplary and are not to be construed as limiting the present inventive concept. The description of the exemplary embodiments is intended to be illustrative, and not to limit the scope of the claims, and many alternatives, modifications, and variations will be apparent to those skilled in the art.

The invention claimed is:

1. A control method of an electronic device, the method comprising:
    displaying a user interface (UI) including a secure indicator indicating that the electronic device operates in a secure mode;
    identifying whether the secure indicator is forged by comparing the secure indicator and a reference secure indicator; and
    notifying that the secure indicator is a forged secure indicator in response to the secure indicator being the forged secure indicator,
    wherein the identifying comprises:
    obtaining data of a frame buffer corresponding to a layer among a plurality of layers and data of a frame buffer corresponding to a layer used for displaying the secure indicator, and
    identifying whether the secure indicator is forged by comparing the obtained data and data of the reference secure indicator.

2. The control method of claim 1, further comprising:
    obtaining data of a frame buffer used for displaying the UI using UI-related information corresponding to the UI; and
    identifying whether the secure indicator is forged by comparing data stored in the frame buffer and the data of the reference secure indicator.

3. The control method of claim 1, wherein the identifying includes:
    obtaining data of a frame buffer corresponding to an uppermost layer among the plurality of layers and the data of the frame buffer corresponding to the layer used for displaying the secure indicator; and
    identifying whether the secure indicator is forged by comparing the obtained data and the data of the reference secure indicator.

4. The control method of claim 1, wherein the identifying includes:
    obtaining, in response to a location in which the secure indicator is displayed in the UI being fixed, data of frame buffers corresponding to layer regions corresponding to the fixed location in which the secure indicator is displayed; and
    identifying whether the secure indicator is forged by comparing the obtained data and the data of the reference secure indicator.

5. The control method of claim 1, wherein the secure indicator includes at least one of an image, text, or an icon.

6. The control method of claim 2, further comprising updating the UI-related information,
    wherein the updating includes updating the UI-related information in any one case of fixed period arrival, user command input for updating the UI-related information, UI generation including the secure indicator, or UI updating including the secure indicator.

7. The control method of claim 2, wherein the UI-related information includes at least one of information for a using application, layer information used in the using application, a memory address and a size of a using frame buffer, or an address and a size of a memory to be used as the frame buffer.

8. An electronic device comprising:
    a storage configured to store data corresponding to a reference secure indicator;
    a display configured to display a user interface (UI) including a secure indicator indicating that the electronic device operates in a secure mode; and
    at least one processor configured to:
        identify whether the secure indicator is forged by comparing the secure indicator and the reference secure indicator in response to the UI being displayed in the display,
        generate a warning event for notifying that the secure indicator is a forged secure indicator in response to the secure indicator being the forged secure indicator,
        obtain data of a frame buffer corresponding to a layer among a plurality of layers and data of a frame buffer corresponding to a layer used for displaying the secure indicator, and
        identify whether the secure indicator is forged by comparing the obtained data stored in the frame buffer and data of the reference secure indicator.

9. The electronic device of claim 8, wherein the at least one processor is further configured to obtain data of a frame buffer used for displaying the UI using UI-related information corresponding to the UI and identify whether the secure indicator is forged by comparing data stored in the frame buffer and the data of the reference secure indicator.

10. The electronic device according to claim 8, wherein the at least one processor is further configured to:

obtain data of a frame buffer corresponding to an uppermost layer among a plurality of layers and the data of the frame buffer corresponding to the layer used for displaying the secure indicator, and identify whether the secure indicator is forged by comparing the obtained data stored in the frame buffer and the data of the reference secure indicator.

11. The electronic device according to claim 8, wherein the at least one processor is further configured to obtain, in response to a location in which the secure indicator is displayed in the UI being fixed, data of frame buffers corresponding to layer regions corresponding to the fixed location in which the secure indicator is displayed and identify whether the secure indicator is forged by comparing the obtained data and the data of the reference secure indicator.

12. The electronic device of claim 9, wherein the at least one processor is further configured to update the UI-related information, in any one case of fixed period arrival, user command input for updating the UI-related information, UI generation including the secure indicator, or UI updating including the secure indicator.

13. The electronic device of claim 8, wherein the warning event includes at least one of warning phrase display, executing program termination, user command non-reception, or warning sound output.

14. The electronic device of claim 9, wherein the UI-related information includes at least one of information for a using application, layer information used in the using application, a memory address and a size of a using frame buffer, or an address and a size of a memory to be used as the frame buffer.

15. A non-transitory computer-readable recoding medium including a program for executing a method of identifying whether a secure indicator of an electronic device is forged, the method comprising:

displaying a user interface (UI) including a secure indicator indicating that the electronic device operates in a secure mode;

identifying whether the secure indicator is forged by comparing the secure indicator and a reference secure indicator; and notifying that the secure indicator is a forged secure indicator in response to the secure indicator being the forged secure indicator, wherein the identifying comprises:

obtaining data of a frame buffer corresponding to a layer among a plurality of layers and data of a frame buffer corresponding to a layer used for displaying the secure indicator, and identifying whether the secure indicator is forged by comparing the obtained data and data of the reference secure indicator.

16. The control method of claim 1, wherein the data of the frame buffers, which correspond to the location of the secure indicator, correspond to a partial section of the UI.

\* \* \* \* \*